July 27, 1926.

K. BERGER

PRESSURE REGULATING VALVE

Original Filed April 12, 1923

1,593,648

INVENTOR
Knute Berger
BY
Frank Warren
ATTORNEY

Patented July 27, 1926.

1,593,648

UNITED STATES PATENT OFFICE.

KNUTE BERGER, OF SEATTLE, WASHINGTON.

PRESSURE-REGULATING VALVE.

Application filed April 12, 1923, Serial No. 631,699. Renewed October 13, 1925.

My invention relates to improvements in automatic release pressure regulating valves and the objects of my invention are to provide a pressure regulating valve that may be interposed between a source of supply of fluid under pressure and any container into which said fluid is to be admitted and that may be adjusted so that it will maintain within the container any desired constant pressure that is less than the pressure of the fluid supplied to the valve.

Another object is to provide a regulating valve that will prevent the compressed fluid in the container with which it is connected to exhaust or escape quickly through the valve.

A further object is to provide a valve in which the opening and closing movements of certain valve members are governed by the pressure of the fluid against one side of a piston that is yieldingly supported by means that serves to equalize the pressure of the fluid, the piston affording the advantage of a relatively long stroke as compared to valves employing movable diaphragms.

Further objects are to provide a valve in which all of the operating parts are movable along the same axial line thereby contributing to the production of a valve that is relatively simple in its plan of construction, efficient in operation, and inexpensive to manufacture.

I accomplish these objects by devices illustrated in the accompanying drawings, wherein—

Figure 1:
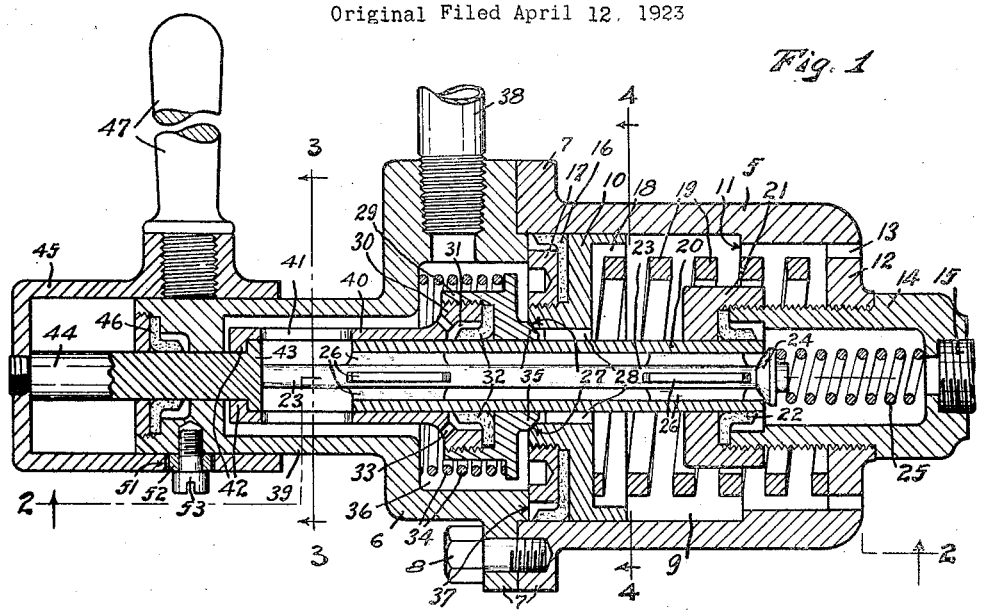
Figure 1 is a view in longitudinal midsection of a valve constructed in accordance with my invention.
Figure 4:
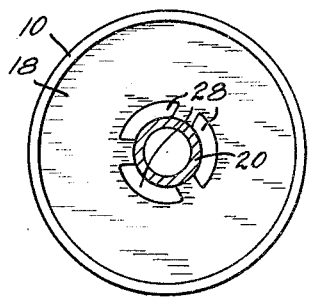
Figure 3:
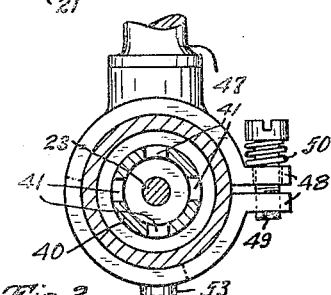

Fig. 3 is a view partly in elevation and partly in cross-section substantially on line 3, 3 of Fig. 1; and Fig. 4 is a detached sectional view of the main piston member substantially on line 4, 4 of Fig. 1.

Referring to the drawings throughout which like reference numerals indicate like parts, the numerals 5 and 6 designate two parts of a tubular housing which are externally flanged as at 7 and are adapted to be rigidly secured together in axial alignment by screws 8.

The housing portion 5 is internally provided with a cylindrical chamber 9 for the reception of a piston 10, the diameter of the chamber 9 being reduced toward the outermost end to form an annular shoulder 11 which may serve as a stop to limit the movement of the piston 10. The housing portion 5 is also provided at the outer end with an end wall 12 having perforations or openings 13 formed therein.

The end wall 12 has a tubular boss 14 projecting both inwardly and outwardly therefrom which forms a fluid inlet chamber, the outer end of said boss being connected with a fluid inlet pipe 15.

The piston 10 is provided on one side with a cup-shaped packing ring 16, as of leather, held in position by a metal disc 17 that screws onto the hub portion of said piston and said piston is preferably recessed on its other side, as at 18, for the reception of one end of a compression spring 19 whose other end abuts against the end wall 12 of the housing member 5.

The piston 10 is integral with or secured to a relatively long axially arranged tubular fluid conduit member 20 that projects in both directions from said piston and is movable therewith within the valve housing. One end of the tubular member 20 projects through a cap 21 and cup-shaped packing ring 22 into the fluid inlet chamber formed by the tubular boss member 14.

The numeral 23 is a valve stem of relatively small diameter that is disposed within the tubular member 20 and provided on one end with a conical valve member 24 that is arranged to seat against the adjacent end of the tubular member 20. The valve member 24 is disposed within the tubular boss 14 and is engaged by a compression spring 25 that is disposed with the tubular boss 14, by which it is urged into a closed position. The valve stem 23 is guided for movement axially within the tubular member 20 by a plurality of fin members 26 that project outwardly therefrom and are spaced in such a manner as to permit fluid to flow freely through the tubular member 20.

The piston 17 is provided in one end of the hub portion thereof with a valve seat 27 and is provided, in alignment with the valve seat 27 and around the tubular member, with a plurality of openings 28 affording a relatively large space through which fluid may escape freely.

Slidably mounted on the tubular member 20 is a valve member, preferably formed of two parts 29 and 30, that are arranged to be screwed together as shown and, when assembled, form an internal cavity 31 wherein is disposed a packing ring 32 that prevents leakage of air between the valve member and the tubular member 20.

Perforations 33 in the member 30 admit fluid under pressure freely to the cavity 31 to compress the packing. A compression spring 34 is used to yieldingly hold a valve head 35 that is provided on the end of the valve part 29 in engagement with the valve seat 27.

The valve member composed of the parts 29 and 30 is disposed within a chamber 36 in the housing portion 6 which chamber is of smaller diameter than the piston chamber 9 and forms an annular shoulder 37 that serves as a stop to limit the movement of the piston 10.

The housing portion 6 is connected with a fluid outlet pipe 38 and is provided with a neck portion 39 of reduced diameter into which a cylindrical shank 40 on the valve part 30 projects, said shank 40 being provided with a plurality of slots 41 to afford a free passageway for fluid and being provided on the end with an inwardly directed annular flange portion 42 arranged to engage with a head 43 on an axially arranged pin 44 that is rigidly secured to the end of an operating sleeve 45 that fits over the exterior of the neck portion 39 of the valve housing. A packing ring 46 is provided in the end of the neck portion 39 around the pin 44 to prevent leakage of fluid outwardly around such pin.

Figure 2:
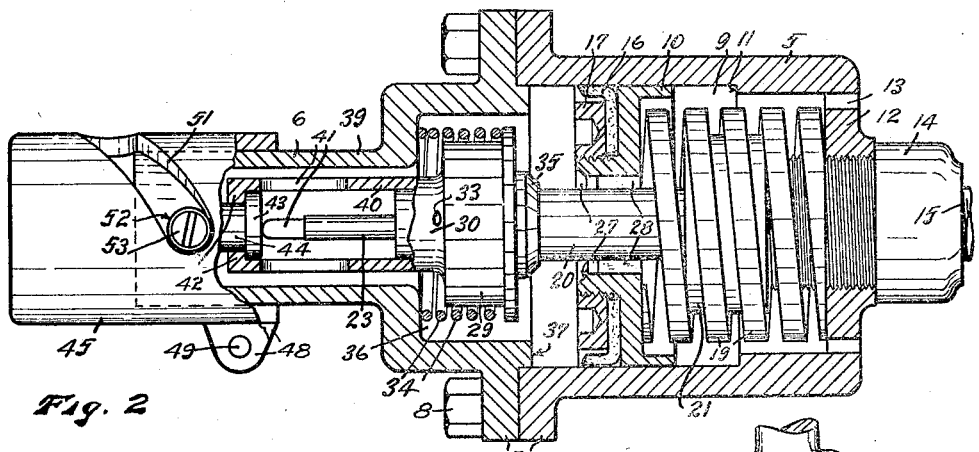
Fig. 2 is a view partly in elevation and partly in section of the same substantially on line 2, 2 of Fig. 1 showing some parts thereof in a different position than they are shown in Fig. 1.

The operating sleeve 45 is provided at one point with a handle 47 by which it may be turned and is further split on one side and provided with flanges 48 that are adjustably secured together by a screw 49 on which is a compression spring 50, as shown in Fig. 3, whereby the frictional grip of the sleeve 45 on the valve neck 39 may be adjusted. The operating sleeve is further provided with a slot 51 that is inclined, as shown in Fig. 2, with respect to a plane that is perpendicular to the axis of the sleeve and is adapted to receive a roller 52 on a pin 53 that is securely screwed into the neck 39 of the valve housing.

From the preceding description it will be obvious that rotation of the sleeve 45 on the neck 39 of the valve housing will move said sleeve lengthwise with respect to the valve housing and that by adjusting the screw 49 the sleeve may be caused to frictionally grip the housing tight enough so that it will remain in any set position but may be readily moved by use of the handle 47.

The mode of operating my valve is as follows:

Assuming that the pipe 15 is connected with any source of supply of fluid, as air under pressure, and the pipe 38 is connected with any receptacle in which a constant fluid pressure less than the pressure at the source of supply is to be maintained, then when there is no pressure in the pipe 38 the several parts will be in the inoperative position shown in Fig. 1, the valves 24 and 27 being closed.

If, from this position, the handle 47 is turned toward the left, as shown in Fig. 3, then the operating sleeve 45 will be moved on the neck member 39 and the pin 44 by pressing on the stem 23 will open the valve 24 and let fluid flow through the tube 20 into the chamber 36 and thence through the pipe 38 into the receptacle, not shown, in which a constant pressure is to be maintained. When the pin 44 is moved inwardly the head 43 of the same will be moved away from the end of the sleeve 40. As the pressure in the chamber 36 increases it will move the piston 10, together with the tube 20 and valve formed of the parts 29, 30, 35 and 40, to the right from the position shown thus compressing the spring 19 and eventually closing the valve 24 by moving the valve seat formed by the end of the tube 20 against such valve.

The resistance offered by the spring 19 will increase in proportion to the amount said spring is compressed and said spring will always be compressed until it equalizes or offsets the pressure of fluid on the opposite side of the piston 10, hence, it is apparent that the positioning of the valve 24 determines the amount of pressure that will be required to close the same, and that after said valve is closed the pressure in the chamber 36 cannot increase, but if such pressure decreases the piston 10 will be caused to move to the left thus opening the valve 24 and admitting more fluid until the pressure in the chamber 36 equals the amount for which the valve is set. By operating the valve in this manner it will be obvious that the valve will automatically maintain a constant pressure in the chamber 36 for any fixed position of the valve 24 and that the position of said valve 24, which may be adjusted by turning of the sleeve 45, will determine whether the pressure in the chamber 36 is relatively low or high as compared to the initial pressure in the pipe 15.

If, when the valve is in operation, and the container connected with the pipe 38 is filled with compressed fluid the position of the handle 47 is reversed so that the sleeve 45 and pin 44 are moved to the left the head 43 of pin 44 which engages with the end of the shank 40 will move the valve 35 from off the valve seat 27, as shown in Fig. 2, and permit the fluid under pressure to exhaust through the passageways 28, chamber 9 and perforations 13. As the pressure in the chamber 36 decreases during exhaust the piston 10, tube 20, stem 23 and valve 24 will all move to the left until the valve seat 27 engages the valve 35 and closes the exhaust passageways 28. The valve may be set as above described either to completely or to partially exhaust the container that is connected with the pipe 38.

The arrangement of the rotatable sleeve 45 with the slot 51 and roller and pin 52 and 53 affords an exceptionally efficient operating means by which the adjustment of the valve may be controlled with great accuracy.

The exhaust position of the parts shown in Fig. 2 is not a permanent position in which the parts will remain for any period of time but is a position which the parts may assume temporarily when the valve is exhausting.

When in use the valve is preferably mounted with the axis thereof vertical and the perforations 13 at the lower end, in which position the valve will be self draining with respect to any liquid that may tend to collect therein.

The foregoing description and accompanying drawings clearly disclose what I now consider to be a preferred embodiment of my invention but it will be understood that the disclosure is merely illustrative and that such changes may be made as are within the scope and spirit of my invention.

What I claim is:

1. A pressure regulating valve embodying a housing having inlet and outlet conduits connected therewith, a piston movable in said housing, resilient supporting means on one side of said piston, a tubular member guided by said piston and projecting in both directions therefrom, a valve stem guided for longitudinal movement within said tubular member and leaving a passageway through said tubular member, a valve on the end of said valve stem arranged to seat on the inlet end of said tubular member, and means operable from the exterior of said housing for adjusting the position of said valve.

2. A pressure regulating valve embodying a valve housing having a piston chamber and fluid inlet and outlet conduits connected with opposite ends of said piston chamber, a piston in said chamber, resilient means supporting said piston on one side, a fluid inlet chamber at one end of said piston chamber, a fluid conduit guided by said piston and arranged to have one end project into said fluid inlet chamber, a valve stem movable lengthwise in said fluid conduit, a valve on the end of said valve stem and arranged to seat on the end of said fluid conduit within said fluid inlet chamber, and means operable from the exterior of said valve housing for moving said valve off of said seat on the end of said fluid conduit.

3. A pressure regulating valve embodying a valve housing having a piston chamber and having inlet and outlet conduits connected with opposite ends of said piston chamber, a piston in said piston chamber, a compression spring supporting said piston on one side, a relatively long fluid conduit guided by said piston, a valve stem movable lengthwise in said fluid conduit, a valve on the end of said valve stem arranged to seat on the inlet end of said fluid conduit, and means operable from the exterior of said valve housing for moving said valve off of said seat.

4. A pressure regulating valve embodying a housing having a piston chamber and having a fluid outlet conduit connected with one end of said piston chamber, means forming a fluid inlet chamber at the other end of said piston chamber, a piston movable in said piston chamber, resilient means supporting said piston on the side adjacent said fluid inlet chamber, a relatively long axially disposed fluid conduit secured to said piston one end of said fluid conduit projecting into said fluid inlet chamber, a valve stem extending through said fluid conduit and movable lengthwise therein, a valve on the end of said valve stem within said fluid inlet chamber and arranged to seat on the end of said fluid conduit, means forming a passageway for fluid through said piston around said fluid conduit, a valve for closing said last named fluid passageway and means operable from the exterior of the valve housing for selectively unseating either said first named valve or said last named valve.

5. A pressure regulating valve embodying a valve housing having a piston chamber provided at one end with openings and having a fluid outlet conduit connected with the other end of said piston chamber, means forming a fluid inlet chamber at the other end of said piston chamber, a piston movable in said piston chamber, resilient means supporting said piston on the side adjacent said fluid inlet chamber, a tubular conduit member secured to said piston, one end of which projects into said fluid inlet chamber, a valve stem extending through said fluid conduit and movable lengthwise therein, a valve on the end of said valve stem within said fluid inlet chamber and arranged to seat on the end of said fluid conduit, means forming a passageway for fluid through said piston around said fluid conduit, a valve seat formed in said piston in connection with said last named fluid passageway, a valve member slidable on said fluid conduit and arranged to seat on said valve seat, and manually operated means for selectively unseating either said first named valve or said last named valve.

6. A pressure regulating valve embodying a valve housing having a piston chamber therein that is provided at one end with passageways opening to the atmosphere, means forming a fluid inlet chamber at one end of said piston chamber, fluid outlet means connected with the other end of said piston chamber, a piston movable in said piston chamber, a compression spring supporting said piston, a fluid conduit member guided by said piston and having one end projected into said fluid inlet chamber, a valve stem extending through said fluid conduit member, a valve on the end of said valve stem within said fluid inlet chamber and arranged to seat on the end of said fluid conduit member, means forming exhaust passageways through said piston, a valve seat at one end of said exhaust passageways, an exhaust valve slidable on said fluid conduit member and arranged to seat upon said valve seat, a spring arranged to press against said first named valve, another spring arranged to press against said exhaust valve, the pressure of said two springs being in opposite directions, and manually operated means for unseating either of said valves in opposition to the pressure of said springs.

7. A pressure regulating valve embodying a housing having a piston chamber therein that is provided at one end with passageways opening to the atmosphere, means forming a fluid inlet chamber at one end of said piston chamber, fluid outlet conduit means connected with the other end of said piston chamber, a piston movable in said piston chamber, a compression spring on the side of said piston adjacent said fluid inlet chamber, a relatively long axially disposed fluid conduit guided by said piston and having one end projected into said fluid inlet chamber, a valve stem extending through said fluid conduit, a valve on the end of said valve stem and arranged to seat on the end of said fluid conduit within said fluid inlet chamber to close the same to the passage of fluid, means forming fluid exhaust passageways through said piston around said fluid conduit, a valve seat at the end of said exhaust passageways on the discharge side of said piston, an exhaust valve slidable on said fluid conduit and arranged to seat upon said valve seat, a spring arranged to press against said exhaust valve, another spring arranged to press against said first named valve, and manually operated means movable axially within said valve housing for selectively opening either of said valves.

8. A pressure regulating valve embodying a valve housing having a piston chamber therein that is provided at one end with passageways opening to the atmosphere, a neck portion of reduced diameter on one end of said valve housing, means forming a fluid inlet chamber at one end of said piston chamber, a fluid outlet conduit at the other end of said piston chamber, a piston movable in said piston chamber, a compression spring on one side of said piston, a fluid conduit member guided by said piston and having one end projected into said fluid inlet chamber, a valve stem extending through said fluid conduit, a valve on the end of said valve stem and arranged to seat on the inlet end of said fluid conduit member, means forming fluid exhaust passageways through said piston, a valve seat at one end of said exhaust passageways, an exhaust valve slidable on said fluid conduit member and arranged to seat upon said valve seat, a spring arranged to press against said first named valve, another spring arranged to press against said exhaust valve, the pressure of said two springs being in opposite directions, a sleeve rotatable on the neck portion of said valve housing said sleeve having an inclined slot means rigid with said valve housing and operable in said slot to move said sleeve lengthwise of said valve housing when said sleeve is rotated, adjustable means for causing said sleeve to frictionally engage with said valve housing, and means connected with said sleeve for opening said valves when said sleeve is moved.

9. A pressure regulating valve embodying a housing, a piston chamber in said housing, an inlet chamber in said piston chamber, a piston having a passageway therethrough in said piston chamber, resilient means supporting said piston, a valve stem movable in said passageway, a valve on said valve stem adapted to close said passageway, resilient means supporting said valve in said inlet chamber, an outlet chamber in said housing, means forming a passageway between said outlet chamber and said piston chamber, a valve for closing said last named passageway, resilient means supporting said last named valve in said outlet chamber, an exhaust outlet passageway in said piston chamber, and means for moving said two valves.

10. A pressure regulating valve embodying a housing having inlet and outlet conduits connected therewith, a piston having a passageway therethrough movable in said housing, a valve adapted to close said passageway, another passageway in said piston, a valve adapted to close said second named passageway, and means for selectively unseating either said first or last named valves.

11. A pressure regulating valve embodying a housing having inlet and outlet conduits connected therewith, a piston having a passageway therethrough, a valve adapted to close said passageway, another passageway in said piston, a valve adapted to close said passageway which valve and piston are movable conjointly in said housing, and means for selectively unseating said two valves.

12. A pressure regulating valve embodying a housing having inlet and outlet conduits connected therewith, a piston having a passageway therethrough, a valve adapted to close said passageway, another passageway in said piston, a valve adapted to close said passageway which valve and piston are movable conjointly in said housing, exhaust outlet means in said housing, and means for selectively unseating said two valves.

13. A pressure regulating valve embodying a housing, a piston chamber in said housing, a piston having a passageway therethrough movable in said piston chamber, an inlet chamber in said housing, a valve in said inlet chamber adapted to close said passageway in said piston, an outlet chamber in said housing, another passageway in said piston, a valve for closing said last named passageway, an exhaust outlet passageway in said housing, and means for moving said two valves.

In witness whereof, I hereunto subscribe my name this 31st day of March A. D. 1923.

KNUTE BERGER.